Feb. 27, 1934.  E. T. McNANEY  1,949,170
OYSTER PACKING APPARATUS
Filed Feb. 21, 1930  10 Sheets-Sheet 1

Inventor
Edward T. McNaney
By Mason Fenwick Lawrence
Attorneys

Feb. 27, 1934.  E. T. McNANEY  1,949,170
OYSTER PACKING APPARATUS
Filed Feb. 21, 1930   10 Sheets-Sheet 3

Inventor
Edward T. McNaney
By Mason Fenwick & Lawrence
Attorneys

Feb. 27, 1934.  E. T. McNANEY  1,949,170

OYSTER PACKING APPARATUS

Filed Feb. 21, 1930     10 Sheets-Sheet 7

Inventor
*Edward T. McNaney*

By *Mason Fenwick & Lawrence*
Attorneys

Feb. 27, 1934.  E. T. McNANEY  1,949,170

OYSTER PACKING APPARATUS

Filed Feb. 21, 1930   10 Sheets-Sheet 9

Inventor
Edward T. McNaney
By Mason Fenwick & Lawrence
Attorneys

Feb. 27, 1934.  E. T. McNANEY  1,949,170
OYSTER PACKING APPARATUS
Filed Feb. 21, 1930    10 Sheets-Sheet 10

Inventor
Edward T. McNaney
By Mason Fenwick & Lawrence
Attorneys

Patented Feb. 27, 1934

1,949,170

UNITED STATES PATENT OFFICE 1,949,170

OYSTER PACKING APPARATUS

Edward T. McNaney, Baltimore, Md.

Application February 21, 1930. Serial No. 430,335

15 Claims. (Cl. 226—69)

This invention relates to a complete apparatus for washing, draining and measuring oysters.

My oyster cleaning machine, as embodied in application bearing Serial No. 280,209, filed May 24, 1928, is utilized in part, but only forms one of the steps that I have found necessary in properly marketing shucked oysters.

I have found that to properly market oysters, it is necessary to wash the same after they have been removed from the shells in order to get rid of the sand and grit which is present. Since the oysters are surrounded with considerable liquid when in the shell, liquid accumulates during the foregoing process, which becomes a part of the water during the washing step. Since the public purchases oysters mainly in bulk, and in view of statutes which require that oysters be so sold, it is next necessary to drain the oysters to remove the surplus water and liquid which is left from the washing.

Where oysters are sold on a large scale, it requires a great deal of time to properly measure and pack the same in cans, or other containers, and where it is done by hand, there is always the human unsanitary element present.

The primary object is to combine all of these steps in a single machine, wherein the oysters will be automatically washed, drained and packed in a continuous succession of steps.

Another object is to control the amount of oysters fed into the washer so that the correct amount will always be fed into containers in the filling machine.

Still another object is to provide means operated by the same power for feeding cans or containers beneath the filling apparatus, so that there will be a continuous filling and feeding of cans as long as oysters are fed into the washing machine, and in turn, through the draining and filling apparatus.

Still another object is to provide means for automatically stopping the feeding apparatus used for the oysters upon the exhausting of the supply of cans, or upon an insufficient amount or overage of oysters being present.

Another object is to provide a measuring device in conjunction with the washer and drainer that will accurately measure the desired amount of oysters and deposit the same in cans or containers.

Other objects will be disclosed in the specification and in the drawings forming a part of this application.

In the drawings:

Figure 39 is vertical section on line 39—39 of Figure 1.

Referring to the drawings, in which similar parts are designated by like numerals:

Numeral 40 designates a washer adapted to receive through chute 41 a quantity of liquid oysters discharged from a feeding device 42. The oysters upon being received in the washer are carried by means of conveyor blades 43 to the forward end of the washer 40 where they are received into the discharge head 44.

During the normal operation of the washer 40, the discharge head 44 is carried above the level of the washer and automatically discharges the oysters into a chute 45, as described in my copending application, Serial No. 280,209, filed May 24, 1928.

The oysters upon leaving the chute 45 are received into a drain table 46 which is adapted to separate the excess water from the bulk of the oysters and automatically discharge the bulk into the hopper 47 of a filling machine, which deposits the oysters into empty cans arranged below the said filling machine, as will hereinafter be more fully described.

Figures 1, 2, 3:
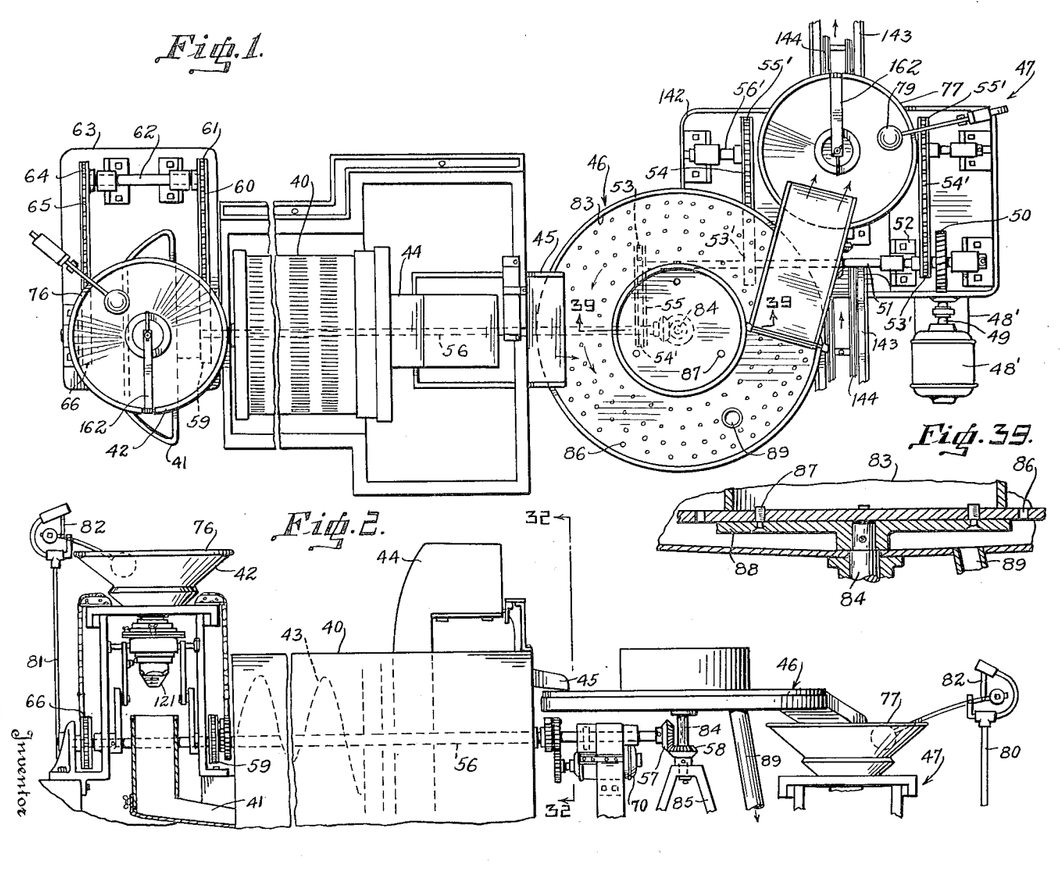
Figure 1 is an assembly view in top plan of my improved system for washing, draining and depositing oysters into cans.
Figure 2 is a side elevation of the same.
Figure 3 is a perspective view of the can filling device showing one position of the same.
Figure 3:
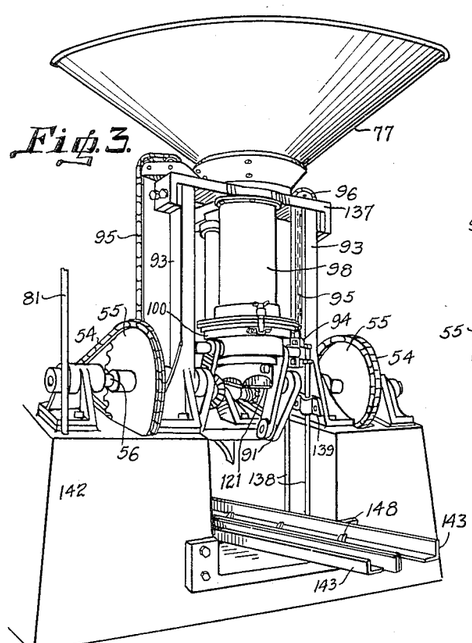
Figure 4:
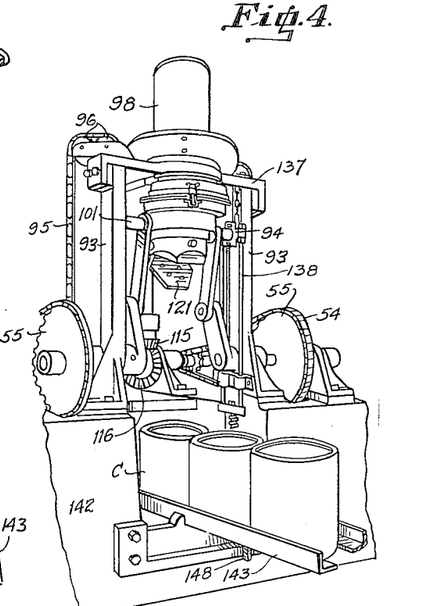
Figure 4 is a similar view with the hopper removed and showing another position of the machine.
Figure 5:
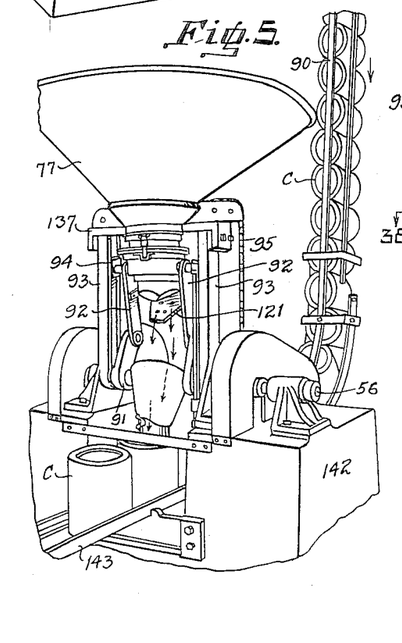
Figure 5 is still another perspective of the same and including the can rack.
Figure 6:
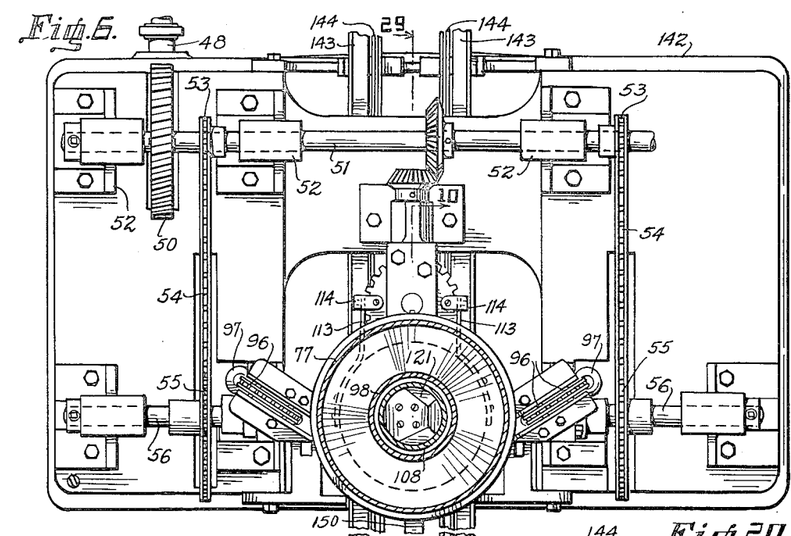
Figure 6 is a top plan of the filling machine with the hopper in cross section.

It is desired to provide a complete system for handling the oysters from the time they are shucked until the time they are deposited into the cans, and my improved system provides for the combination of units as shown in Figures 1 and 2.

Figures 8, 9, 21, 22, 23, 24, 25:
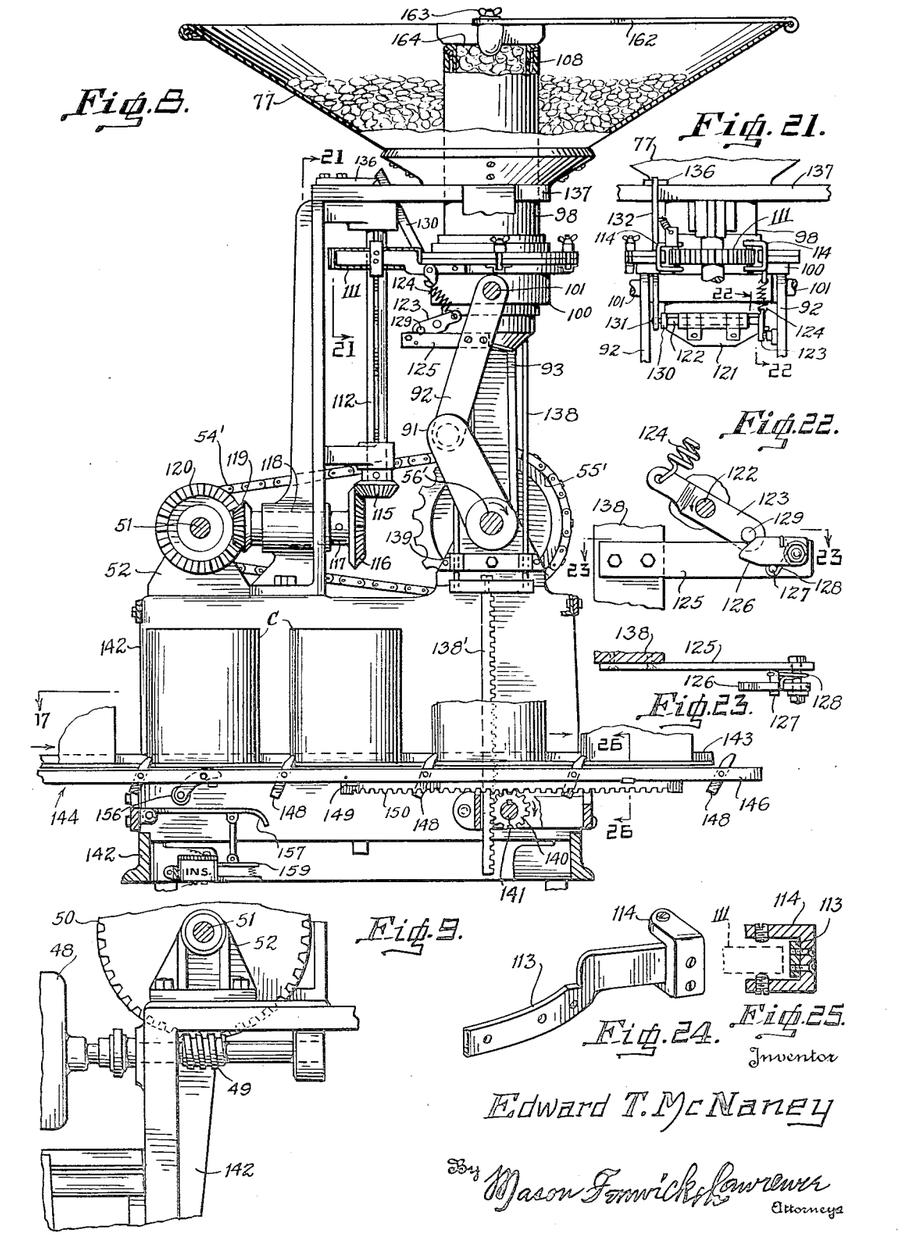
Figure 8 is a vertical section on the line 8—8 of Figure 7, showing the measuring cylinder in raised position.
Figure 9 is a fragmentary side elevation showing the primary drive motor and the reducing gear.
Figure 21 is a vertical section on the line 21—21 of Figure 8.
Figure 22 is a vertical section on the line 22—22 of Figure 21.
Figure 23 is a horizontal section on the line 23—23 of Figure 22.
Figure 24 is a perspective of one of the devices which support the cylinder drive gear.
Figure 25 is a vertical section on the line 25—25 of Figure 12.

A motor 48 is supported adjacent the can entering end of the filling machine upon a bracket 48' and is provided, as shown in Figure 9, with a worm 49 adapted to mesh with a reducing gear 50 carried by the main drive shaft 51, which is supported upon bearings 52, the said shaft 51 extending across the filling machine at right angles to the path of travel of the empty cans.

The shaft 51 is extended beyond one edge of the filling machine and provided with a sprocket wheel 53 and connected to a similar sprocket wheel 54 by a chain 55, the said sprocket 54 being carried by the shaft 56 of the washer 40.

From the foregoing it may be seen that the motor 48 is adapted to drive the washer 40 and by means of bevel gear 57, carried by one end of the shaft 56, and a similar bevel gear 58, carried by the vertical shaft of the drainer 46, it may also drive the drainer 46.

The shaft 56 of the washer extends through the wall adjacent the feeding device 42 and is provided with a sprocket 59 to be connected by means of chain 60 to a similar sprocket 61 carried by a shaft 62 at the rear end of a base member 63 of the feeding device 42. The shaft 62 is provided at its opposite end with another sprocket 64 similar to sprocket 61 and connected by a chain 65 to a sprocket 66 similar to sprocket 59 and positioned in alignment with the same, for a purpose to be hereinafter more fully described.

From the foregoing, it may be seen that motor 48 is utilized to provide a driving means for the complete combination of units composed of the feeding unit 42, the washer 40, the drainer 46 and the filling machine. Suitable means have been provided to take care of the suspension and exposure of the oysters which may at infrequent intervals occur in the washer, that is, at times the discharge head may come to a stop in the position shown in Figure 32, which is just before the discharge position has been reached. In this position, the discharge head 44 may be filled with oysters and since it is highly desirable that some means be provided for continuing the movement of the discharge head 44 to insure that the oysters will be discharged instead of remaining in the discharge head in a comparatively solid condition and exposed to the atmosphere, the means hereinafter described are provided.

The shaft 56 may be provided between the washer and the drainer with a cam 67, adapted to be engaged by the roller 68 of a switch mechanism 69, the said switch mechanism 69 being connected by suitable wiring to a motor 70, supported adjacent the cam 67. Between the cam 67 and the washer 40, the shaft 56 is provided with a ratchet wheel 71, fixedly secured to said shaft, and adapted to normally overrun the pawl 72 of a gear 73 carried freely by the shaft 56 adjacent the ratchet 71.

The motor 70 is provided with a gear 74 normally in mesh with gear 73. When the discharge head 44 stops in the position shown in Figure 32, the roller 68 is positioned in the depressed portion of the cam 67 to close a circuit through the battery 75 in order to energize the motor 70. The gear 74 being in mesh with gear 73, will drive the same, and the pawl 72, carried by gear 73, will drive ratchet 71 to rotate the shaft 56 and carry the discharge head 44 into a discharge position, thereby preventing the discharge head 44 from being left in a stationary position when there are oysters within it.

It is also desired to provide suitable means disposed within the hoppers 76 and 77 of the feeding device 42 and the filling machine 47 to insure that these devices will operate so long as a predetermined quantity of oysters shall be therein; however, should the quantity of oysters be more or less than the predetermined quantity decided upon, suitable means are provided to stop the operation of the said devices until this condition has been corrected.

Figures 32, 33, 34, 35, 36:
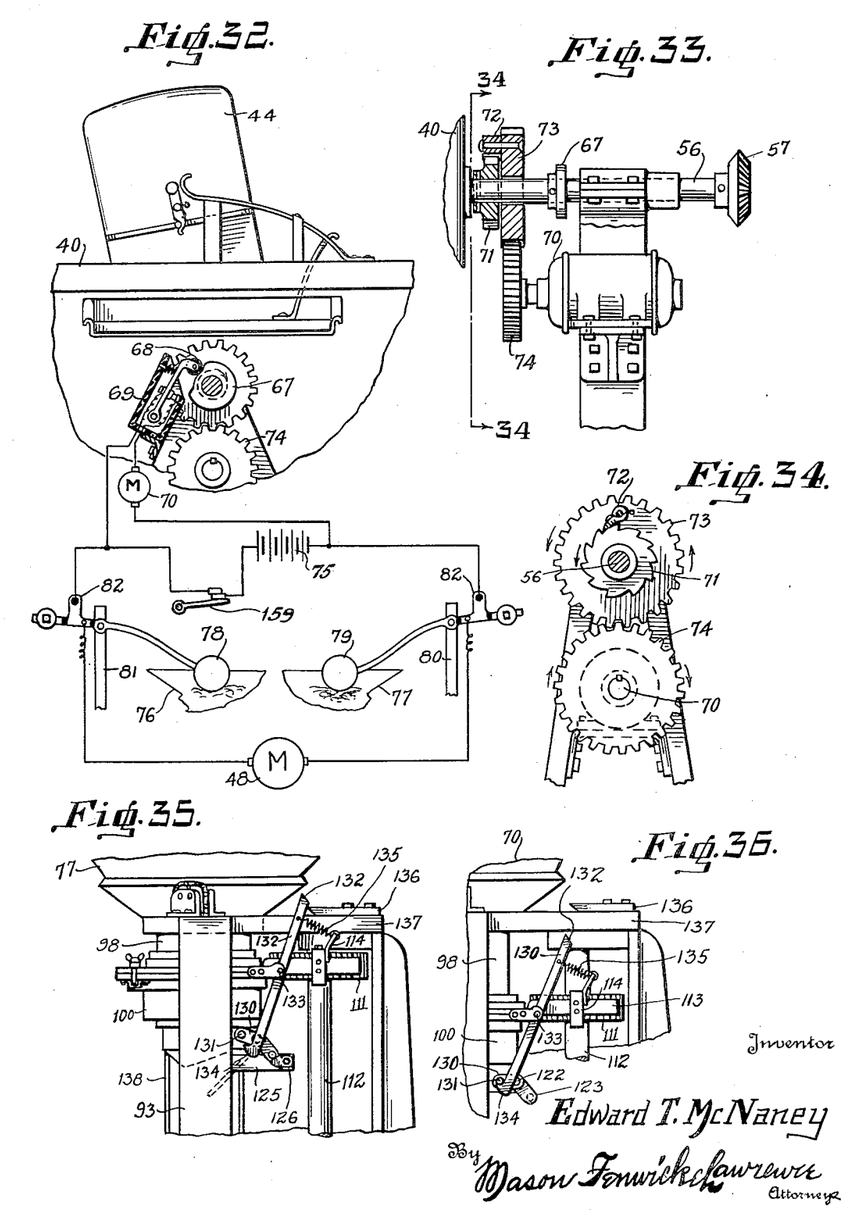
Figure 32 is a vertical section on the line 32—32 of Figure 2, and including a wiring diagram to illustrate the use of the safety float switches.
Figure 33 is a fragmentary side elevation of the parts disposed below the drainer adjacent the washer.
Figure 34 is a vertical section on the line 34—34 of Figure 33.
Figure 35 is a fragmentary side elevation showing parts of the hopper and cylinder to illustrate the use of the safety latch which locks the discharge door of the cylinder until the latch is released, as shown.
Figure 36 is similar to Figure 35, but shows the safety latch in locked position.
Figures 37, 38:
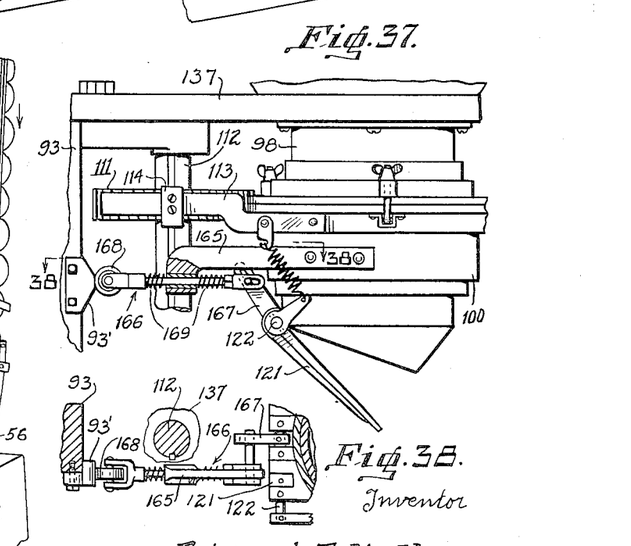
Figure 37 is a fragmentary side elevation of the measuring cylinder showing a modified construction to open and close the discharge door.
Figure 38 is a horizontal section on the line 38—38 of Figure 37.
Figure 40:
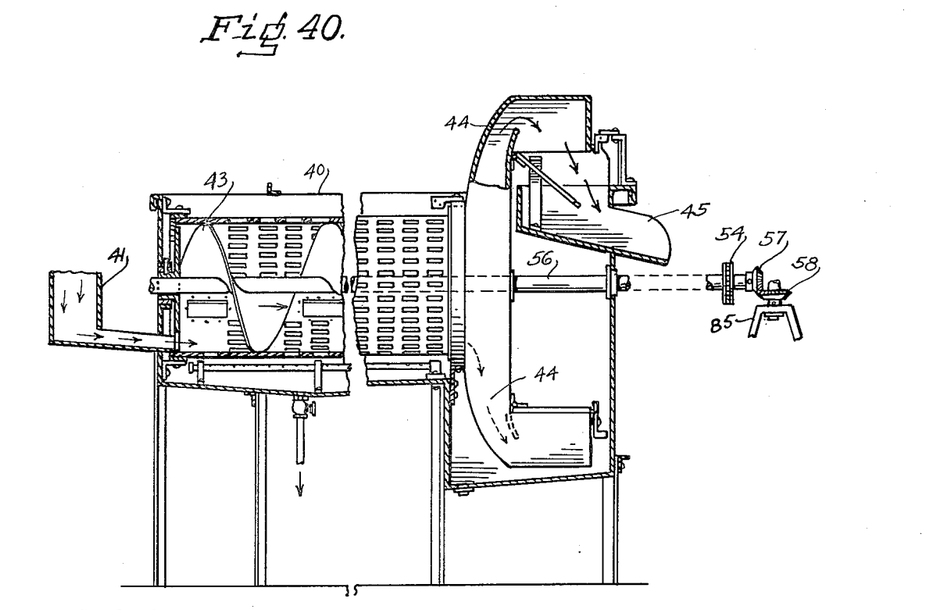
Figure 40 is a sectional elevation of the washer and scoop.
Figure 41:
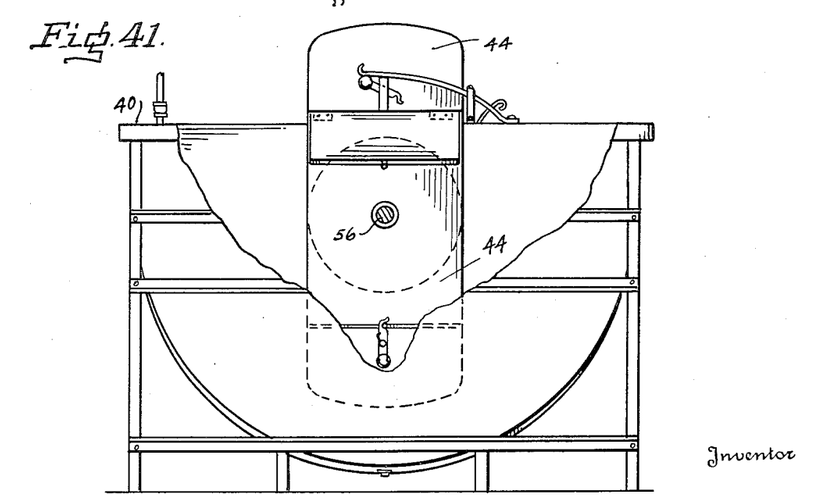
Figure 41 illustrates an end view of Figure 40.

As shown in the diagram of Figure 32, the float members 78 and 79 are pivotally supported at 80 and 81, the ball portion being adapted to rest upon the surface of the oysters within the hoppers, and having at the opposite ends suitable counterweights. A contact arm 82 is provided upon each float member and normally when the predetermined amount of oysters is in the hopper, the contact arm 82 will close a circuit through the source of power 75 to insure the operation of the combined units.

It may be seen from the foregoing that during the normal operation of my improved system, a predetermined quantity of oysters may be fed from the feeding device 42 into the washer 40 and by means of discharge head 44 deposited upon the drainer 46 and discharged into the filling machine 47; and, by reason of means to be hereinafter more fully described, a predetermined quantity of oysters will be received at the feeding end while the same amount is being discharged into the filling machine, thereby insuring a uniform quantity of oysters within the system during normal operation.

The drainer 46 is composed of a horizontal circular frame 83 supported by a vertical shaft 84 which in turn is supported upon suitable standards 85, and is adapted to receive the oysters in their liquid state upon a perforated revolving plate 86 for the purpose of draining the liquid from the oysters while they are being transferred to the filling machine; the plate 86 being provided with apertures to receive the lugs 87 of driving plate 88 carried by the vertical shaft 84. The drain pipe 89 is provided to carry off the water received from the perforated plate 86.

Referring to the can filling machine, it is the general purpose of this device to receive from a feeding chute 90 a continuous supply of empty cans, and by means of a novel combination of parts, to feed a continuous string of cans into position beneath the discharge end of the machine.

The filling machine, as before stated, is provided with a main drive shaft 51 and by means of sprockets 53' and 55' and chains 54', motion is transmitted to a shaft 56', the said shaft 56' having its inner ends divided and provided with crank arms 91.

The opposite ends of the cranks 91 are connected by means of arms 92 to a vertically reciprocating hollow measuring device. In order to guide the measuring device during this reciprocation, suitable standards 93 are provided to slidably receive extensions 94 of the measuring device, and connected to said members 94 are chains 95 adapted to be trained over pulleys 96 and extend downward to suitable balance weights 97. The purpose of the weights being to balance the weight of the oysters and measuring device upon the upstroke of the machine.

The hollow measuring device consists of an outer hollow cylindrical wall 98, detachably secured to a split frame member 99, the lower part 100 of the frame member 99 being provided with wrist pins 101 to which are attached the arms 92 and the guide members 94.

The two halves of the frame member 99 are detachably connected by means of flange members 102 and 103 having a plurality of slots 104 cut into the edge thereof to receive bolts 105 for the purpose of detachably locking the two frame members together. The bolts 105 are pivoted to one of the flanges 102, and are provided with wing nuts 107 to draw the two halves of the frame 99 into a secure locked position during normal operation of the machine.

During the normal operation of the filling machine, it is desired to discharge a predetermined quantity of bulk oysters into the cans and to this end it is necessary to provide a measuring device which will insure that a standard quantity may be furnished at all times. Concentrically disposed within the hollow cylinder 98 is a measuring cylinder 108 spaced therefrom by means of a spacing flange 109 and having secured to its lower portion a gear 110 which is received between the offset portions of the flange members 102 and 103.

The gear 110 is driven by a suitable gear 111 slidably keyed to a shaft 112 and adapted to travel with the measuring device during its reciprocation. Arms 113 are secured to the lower frame member 100 and extend to opposite sides of the gear 111 and are provided with supporting clips 114, which are adapted to support the gear 111 and cause the same to travel in unison with the measuring device upon its reciprocation. Thus it may be seen that the measuring cylinder 108 may be rotated continuously during the reciprocation of the measuring device. Should it be desired to furnish a different amount of oysters, the measuring cylinder 108 may be removed by means of the detachable frame members 9 and 100, and a different size of measuring cylinder substituted therefor.

As clearly shown in Figure 8, the shaft 112 is provided at its lower end with a bevel gear 115 adapted to mesh with a similar bevel gear 116 carried by one end of a shaft 117 journaled in suitable bearings 118, the shaft 117 having at its opposite ends a bevel gear 119 in mesh with a similar bevel gear 120 disposed upon the shaft 51. Thus it may be seen that the gear 111 may be continuously rotated and at the same time may be reciprocated upon its shaft to cause continuous rotation of the hollow measuring cylinder 108.

Figures 10, 14, 15, 16, 28:
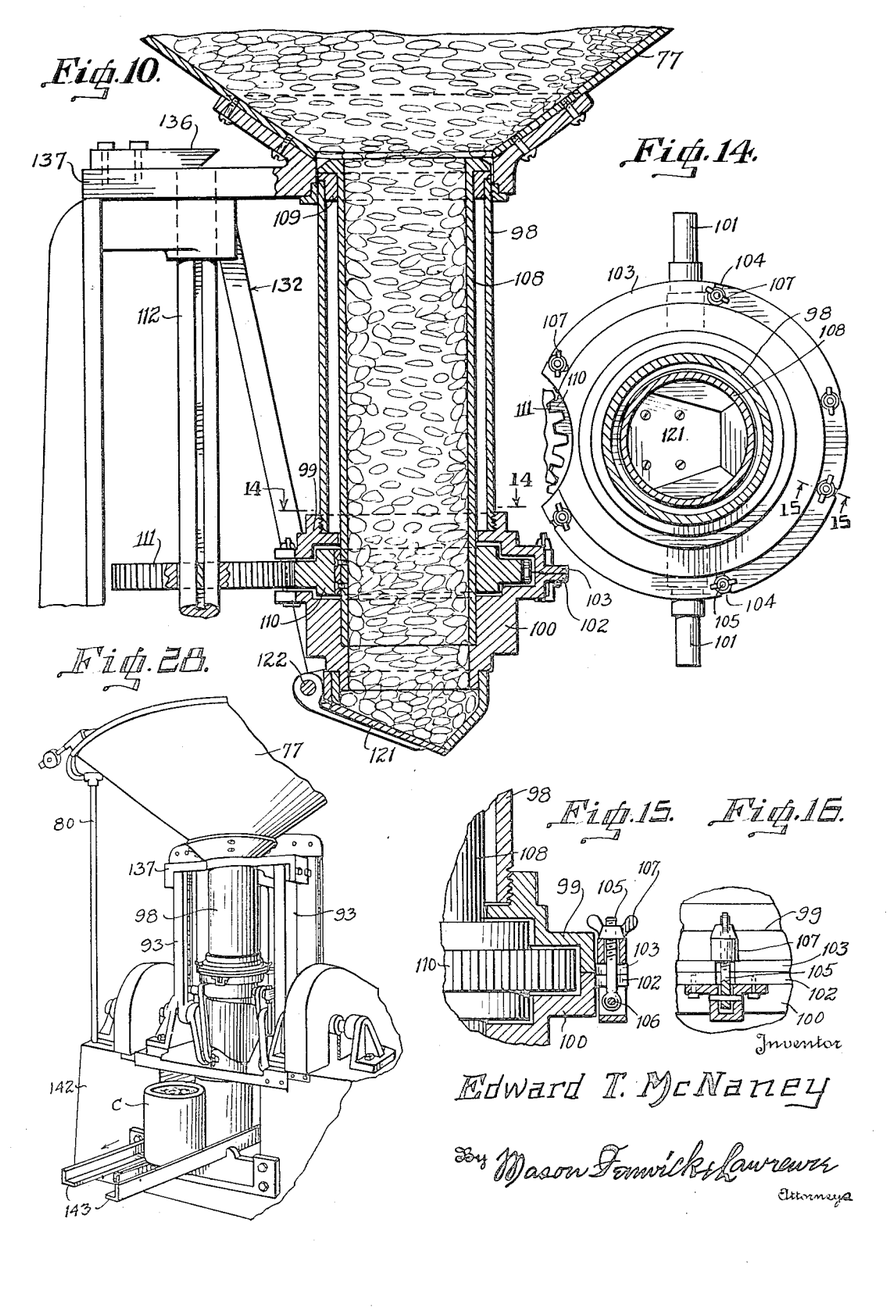
Figure 10 is a vertical section on the line 10—10 of Figure 6.
Figure 14 is a horizontal section on the line 14—14 of Figure 10.
Figure 15 is a vertical detailed section on the line 15—15 of Figure 14.
Figure 16 is a fragmentary side elevation of Figure 15.
Figure 28 is a perspective view of the filling machine similar to Figure 5.
Figures 11, 13:
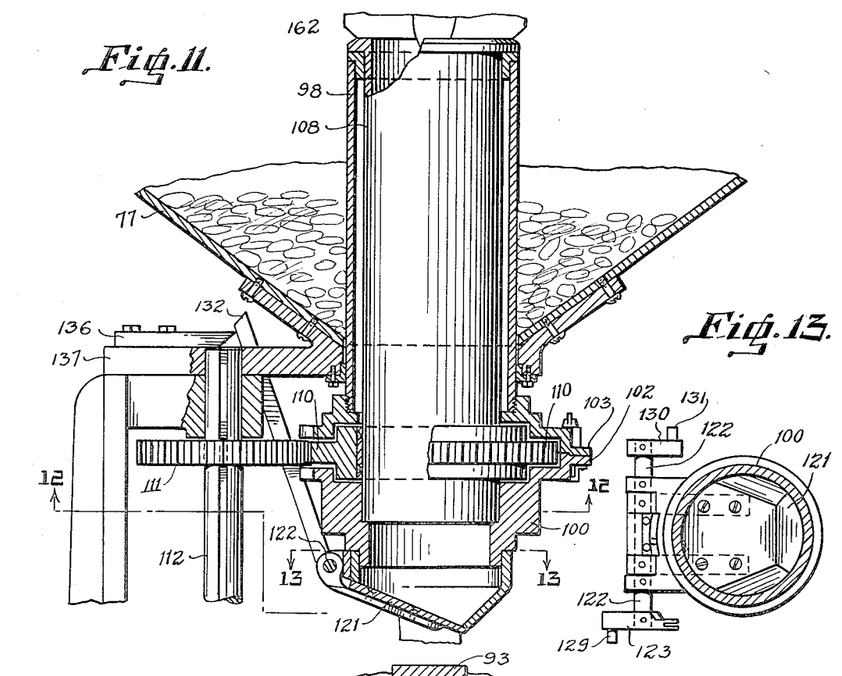
Figure 11 is a similar view showing another position of the measuring cylinder.
Figure 13 is a horizontal section on the line 13—13 of Figure 11.
Figure 12:
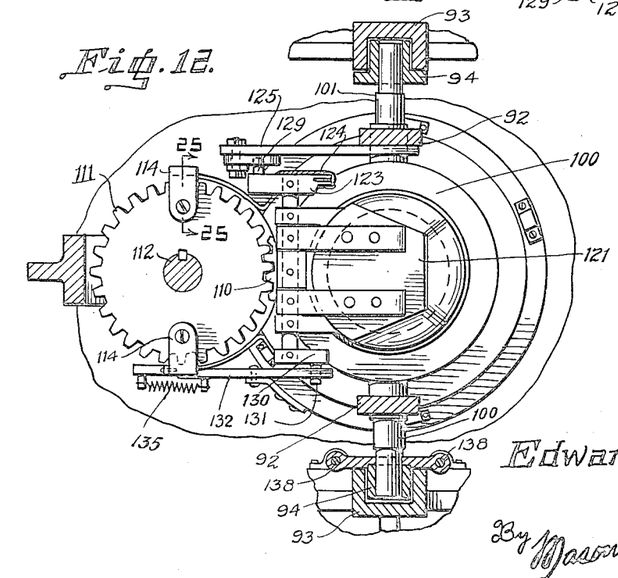
Figure 12 is a horizontal section on the line 12—12 of Figure 11.
Figure 17:
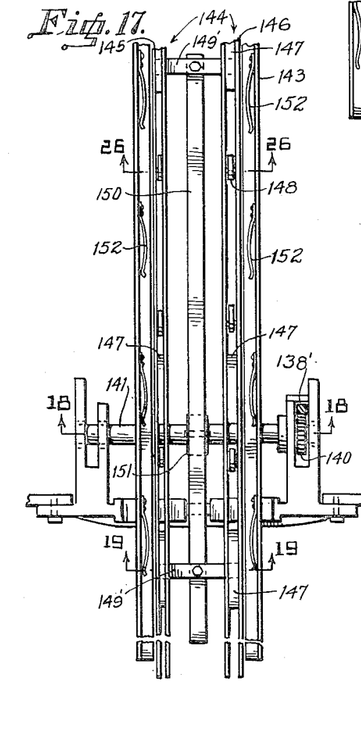
Figure 17 is a horizontal section on the line 17—17 of Figure 18.
Figures 18, 19:
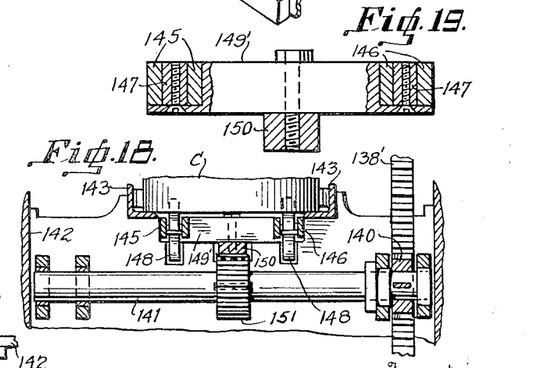
Figure 18 is a vertical section on the line 18—18 of Figure 17.
Figure 19 is a vertical section on the line 19—19 of Figure 17.
Figure 20:
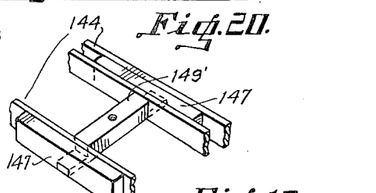
Figure 20 is a fragmentary perspective of part of the can feeder rack.
Figure 26:
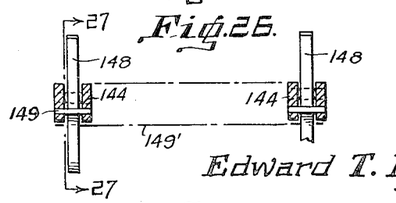
Figure 26 is a vertical section on the line 26—26 of Figure 8.

As clearly shown in Figures 10, 11 and 12 the open end of the frame member 100 is provided with a closure gate 121, suitably hinged at 122, the said hinge having a short arm 123, one end of which is engaged by a spring 124 which is carried by arms 113 and normally serves to hold the closure gate 121 in closed position.

The hopper 77 of the filling machine is provided with a suitable quantity of oysters to be received into the measuring cylinder 108 and it is desirable to insure that the closure gate 121 will remain in a closed position until such time as the measuring cylinder 108 is carried above the level of the oysters in the hopper 77.

The connecting arm 92 is provided, as shown in Figure 8, with an extension 125 provided at its outer end with a striking member 126 pivotally secured thereto, and by reason of a top pin 127 and a spring 128 adapted to form a striking device which will be rigid in one direction and will give if acted upon in the other direction.

The arm 123 is provided at its end opposite from the spring 124 with a striking pin 129 adapted to be engaged by the bevel face of the striking member 126 upon the upstroke of the measuring device, as shown in Figure 22, in order to rock the hinge 122 of the closure gate 121 sufficiently to allow the depositing of oysters within a can. It is readily seen that the closure gate 121 will be instantly snapped to a closed position by the spring 124, so that upon the downward movement of the measuring device, the oysters which drop into the measuring cylinder 108 are prevented from being discharged.

As shown in Figures 12, 35 and 36, the hinge pin 122 of the closure gate 121 is provided at its end, opposite from the arm 123, with a similar arm 130 having a striking pin 131. A safety latch arm 132 is pivotally secured at 133 to the frame member 99 and is provided at the lower end with a hook portion 134, adapted to be held in locked engagement with the striking pin 131 by means of a spring 135, secured to the upper end of the safety latch 132, and to the supporting clip 114. A bumper plate 136 is secured to the cross head 137 which connects the guide standards 93 and is disposed within the path of the safety latch 130 in order that immediately prior to the engagement of the striking pin 129 with the striking plate 126 to open the closure gate 121, the upper bevel edge of the safety latch 132 may engage the bevel edge of the bumper plate so that the safety latch may be caused to rock upon the pivot 133 and release the striking pin 131. Thus it may be seen that a safety latch mechanism has been provided which will insure the closure of the lower end of the measuring cylinder 108 and will be disengaged prior to the action of the striking plate 126 upon the pin 129 to open the said closure gate 121.

I have now described how a suitable quantity of bulk oysters may be received into a measuring device and at the proper time discharged therefrom, and I will now describe the novel means which I have devised to insure that a continuous succession of cans may be fed into filling position beneath the said measuring device.

Figure 7:
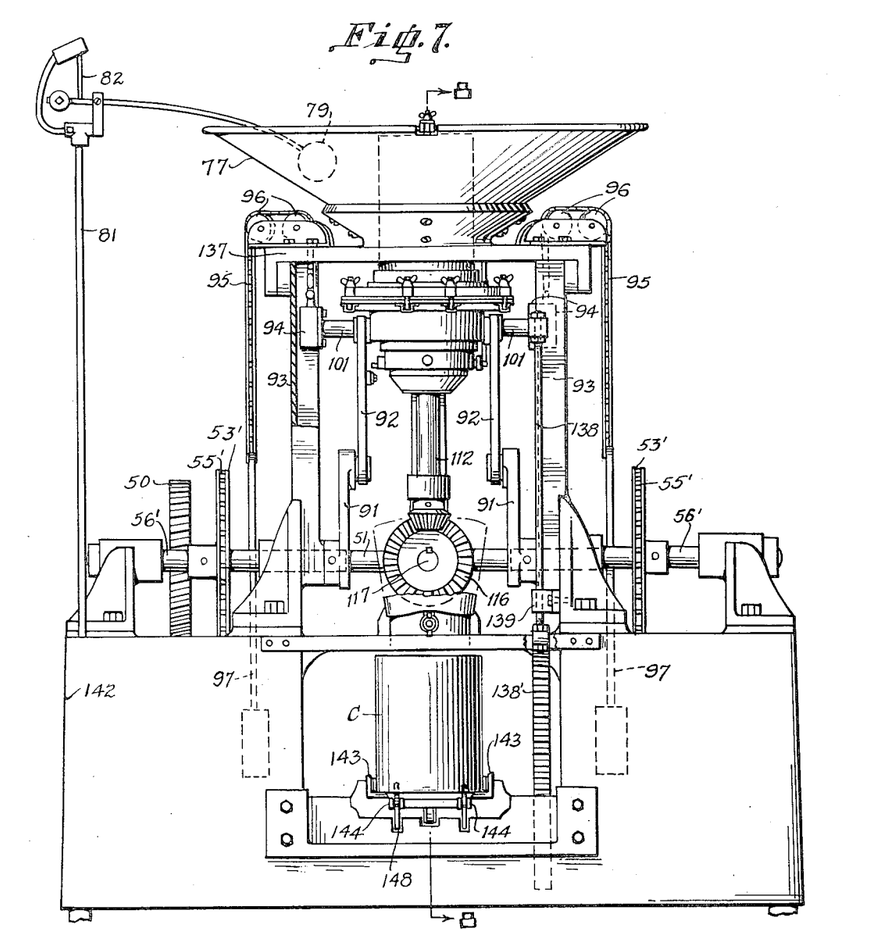
Figure 7 is an elevation of the filling machine from the can entering end.

As shown in Figures 7 and 8 one of the wrist pins 101 is provided with downwardly extending rods 138 suitably guided by guide member 139 and having at its lower end a vertical driving gear rack 138′ to be normally in mesh with a gear 140 carried by a horizontal shaft 141 disposed transversely of the frame 142 of the can filling machine near its lower portion thereof, the purpose of which will now be described.

The filling machine frame 142 is provided centrally with an open section to receive a can supporting rack composed of parallel spaced angle irons 143 extending beyond the machine forwardly to the point where the filled cans are removed, and rearwardly to the lower end of the can feeding chute 90, which may normally feed by gravity, a continuous supply of cans to the rear end of the angle iron members 143.

It is now desired to provide a novel means by which the empty cans may be successively fed into position beneath the discharge gate 121 of the measuring device at the time of discharge; and to this end I have provided a novel can conveyor rack 144.

The can conveyor rack 144 is disposed in parallel relation to the angle irons 143 slightly within and below the same, and consists of a pair of tracks 145, 146, each being composed of a pair of parallel strips. The tracks 145 and 146 are constructed so as to leave a space between the parallel strips by means of suitable spacers 147, and at regular intervals are provided with pivoted conveyor pawls 148, limited in one direction by stop pins 149.

The tracks 145 and 146 are connected by transverse arms 149′, to which are connected centrally and in parallel relation to said tracks, a horizontal rack gear member 150 adapted to engage a gear 151, carried by the shaft 141, centrally thereof, and fixedly secured thereto, to be rotated in unison with the gear 140.

It may now be seen that upon the down stroke of the measuring cylinder 108, to a point where the upper surface of the cylinder is flush with the lowest portion of the hopper 77, as shown in Figure 10, the cylinder becomes filled with oysters, and upon this downward movement, the rack gear 138′ carried by the rods 138 engages the gear 140 and through the medium of gear 151 fixed to the shaft 141 the horizontal rack gear 150 attached to the can conveyor rack 144 will be caused to move rearwardly toward the can feeding chute 90.

Figure 27:
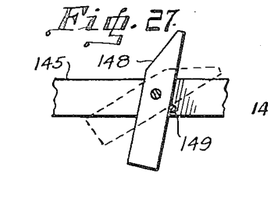
Figure 27 is a vertical section on the line 27—27 of Figure 26.

The conveyor pawls 148 being pivoted, as shown in Figure 27, will ride beneath the cans already in position upon the angle irons 143 and the said cans may be held against displacement by means of flat tension springs 152 fastened to the angle irons 143 to engage the sides of the cans.

The cans, upon leaving the chutes 90, are held at the rear end of the can filling machine by a retarding device, to be later more fully described.

At the end of the rearward movement of the can conveyor rack 144, the rearmost conveyor pawl will move under and beyond the next succeeding can which has just been received from the chute 90, and is to be moved forward to be subsequently filled.

Upon the further operation of the machine the measuring cylinder 108 will move upward with its contents toward the discharge position and at the same time the rack gear 138′ will cause the can conveyor rack 144 to move forwardly. The empty can which is disposed in alignment with the measuring cylinder 108 will be filled during the next step in the operation of the machine, and upon completion of the upstroke, the filled can will be moved forward to the delivery position and a new can moved into filling position and held therein by means of the tension springs 152, suitably placed upon the angle irons 143.

Thus it may be seen that the upstroke of the machine will cause the filling of an empty can, and the moving up of the succeeding can to replace the filled can upon the delivery of the filled can beyond the machine.

In order to prevent the piling up of empty cans at the lower open end of the feeding chute 90 and the rear end of the can conveyor rack 144, a suitable retarding means has been provided in order to retard the feeding of the oncoming cans until the can next to be fed forward toward the filling position has been freed from the retarding device.

To this end, I have provided to one side of the can conveyor rack 144, adjacent the chute 90, a pivoted arm member 153 supported by bracket 154, and having one free end in contact with the can next to be fed forward, and by reason of this contact, the opposite free end of the arm 153 is held in the path of the succeeding can to retard its forward movement. When the can conveyor rack moves rearwardly until the conveyor pawls engage the can C, the releasing of the can C will allow the arm 153 to be swung upon its pivot so that the retarding portion 154 may be drawn outwardly by spring 155 to release the can C′.

Thus it may be seen that a novel retarding device has been provided to control the movement of the cans from the chute 90 onto the can conveyor rack 144 and to allow the release of the cans continuously and in regular order.

During the normal operation of the can filling machine, a continuous supply of cans is fed forward into filling position; but should the supply of cans be exhausted, it is then desired to provide a safety switch mechanism which will terminate the operation of the machine until additional cans are fed into the can chute 90.

Figure 29:
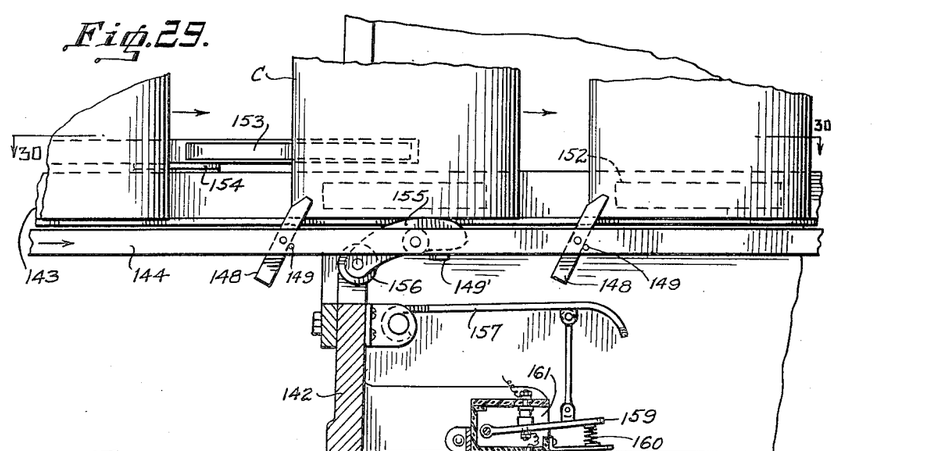
Figure 29 is a vertical section on the line 29—29 of Figure 6.
Figure 30:
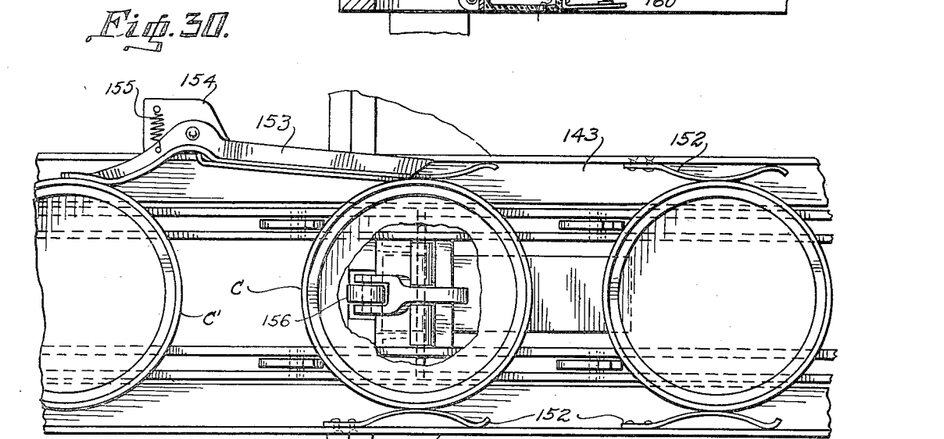
Figure 30 is a horizontal section on the line 30—30 of Figure 29; showing a different position of the cans.
Figure 31:
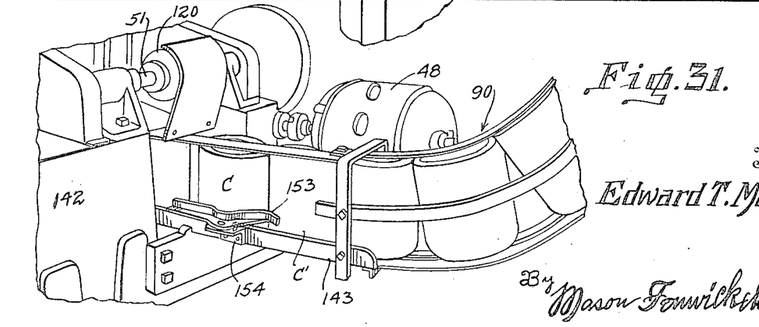
Figure 31 is a fragmentary perspective showing the cans entering the filling machine.

To this end, I have provided an automatic switch means pivoted to the can conveyor rack 144, having its upper end normally extending into the path of the on-coming can and its lower end provided with a roller 156 adapted to be normally held out of engagement with the switch plate 157 by reason of the on-coming can forcing the upper end of the switch member to be swung upon its pivot. The switch plate 157 is connected by means of a link 158 to a pivoted contact plate 159 which, in the position shown in Figure 29, closes a circuit in order to insure continuous operation of the filling machine so long as the supply of cans is provided.

Should the supply of cans be interrupted the switch member 155 will assume its normal upright position, and the roller 156 will depress the plate 157, overcoming the spring 160 and breaking the contact at 161 in order to stop the filling machine when the supply of cans has been exhausted.

In order to insure that a standard measure of oysters will be fed from the measuring cylinder 108, a leveling device 162 has been provided, consisting of an arm hingedly secured to the outer edge of the hopper 77, and having a leveling device fastened to the inner free end, the said leveling device being connected to the arm by means of wing nut 163 and having a central conical portion adapted to extend within the measuring cylinder 108, and a horizontal wiping edge 164 adapted to engage the outer surface of the same in order to insure that a level amount of oysters will be deposited from the measuring cylinder. The rotation of the measuring cylinder 108 will cause the leveling surface 164 to clear the upper edge of the cylinder and the central conical portion will serve to prevent the usual mound that occurs at the center of the cylinder.

A modified form of construction similar to that shown in Figures 8, 22 and 23 has been provided to effect the opening and closing of the closure gate 121 at the lower end of the measuring cylinder 108. A bracket 165 is fixed to the lower frame member 100 and extends toward the standard 93, and midway therebetween provides a bearing for a cam closure device 166.

The closure device 166 is connected at one end to a short arm 167 fixedly secured to the hinge 122 of the closure gate 121, and having at its opposite end a roller 168 adapted to normally ride upon the surface 93' of the standard 93. Tension springs 169 are provided upon opposite sides of the bearing portions of the arm 165. Upon the upward stroke of the measuring cylinder, the roller 168 rides upon the surface 93', and at the point where it is desired to open the closure gate 121, the roller 168 rides up on a cam plate 170, and by reason of its connection to arm 167, causes the hinge 122 to rock and momentarily open the closure gate 121 to allow the discharge of oysters.

The feeding mechanism 42 shown in Figures 1 and 2 is identical in construction and operation with the can filling machine, with the exception of a ratchet drive 171 for a purpose to be now described.

When the condition shown in Figure 32 is desired to be corrected, it is necessary to turn the shaft 56, and in order to prevent this motion from being transmitted to the feeding mechanism 42, the ratchet drive 171, identical in construction with the parts 71, 72 and 73, as shown in Figure 33, is provided. The feeding mechanism is timed in unison with the can filling mechanism, so that the same amount of oysters which is released from the feeding mechanism may also be released from the can feeding mechanism.

From the foregoing description, it may readily be seen that I have provided a novel, practical and efficient system of handling oysters from the time they are shucked until they are deposited into the cans, and suitable safety means have also been provided to insure the continuous operation of the various units so long as a supply of oysters and containers is available; and I have further provided means to insure a standard measure of oysters at all times.

Changes in the size, shape and arrangement of the parts may be made without departing from the spirit of the invention or the scope of the following claims:

1. An oyster packing apparatus comprising a washer, drainer and container filler, means for conveying oysters from said washer to said filler and for controlling the amount of oysters fed into the said container filler.

2. An oyster packing apparatus comprising a washer, drainer and container filler, means for conveying oysters from said washer to said filler and for controlling the amount of oysters fed into the said container filler, said means controlling the amount of oysters fed into said filler located on said washer.

3. An oyster packing apparatus comprising washer, drainer and container filler, means for conveying oysters through said washer and drainer into said filler, a discharge head in said drainer, auxiliary means in connection with the said discharge head for insuring the discharge of said oysters should the said means for conveying the oysters cease to function.

4. An oyster packing apparatus comprising washer, drainer and container filler, means for conveying oysters through said washer and drainer into said filler, a discharge head in said drainer, auxiliary means in connection with the said discharge head for insuring the discharge of said oysters should the said means for conveying the oysters cease to function including on overriding clutch a cam operated switch and a motor geared to said clutch.

5. An oyster packing apparatus comprising a washer, drainer and container filler, means for conveying oysters from said washer to said filler and for controlling the amount of oysters fed into the said container filler, and means for measuring the amount of oysters fed into said washer.

6. An oyster packing apparatus comprising a washer, drainer and container filler, means for controlling the amount of oysters fed into said washer, means for conveying oysters from said washer to said filler, means for measuring the amount of oysters to be dispensed from said container filler, means for indicating an insufficient or overage of oysters in the apparatus.

7. A filling and measuring apparatus comprising a frame, a hopper mounted on said frame, a measuring container slidably mounted in said frame, means for raising and revolving said container into said hopper, and means for dispensing the contents of said measuring container at a predetermined position.

8. A filling and measuring apparatus comprising a frame, a hopper mounted on said frame, a measuring container slidably mounted in said frame, means for raising said container into said hopper, means for removing the surplus contents of said container, and other means for dispensing the contents of said container at a predetermined position.

9. A filling and measuring apparatus comprising a frame, a hopper mounted on said frame, a measuring container slidably mounted in said frame, means for raising and lowering said container through the contents of said hopper, means for dispensing the contents of said container before the container is lowered, means for returning said dispensing means to a closed position, and means for indicating an insufficiency or overage of the product to be measured and dispensed.

10. A filling and measuring apparatus comprising a frame, a hopper mounted on said frame, a measuring container slidably mounted in said frame, means for raising and lowering and revolving said container through and above the contents of said hopper, a gate hingedly connected to the bottom of said container, means for opening said gate at a predetermined position after the container has been filled, and means for closing said gate during the downward movement of said container.

11. A filling and measuring apparatus comprising a frame, a hopper mounted on said frame, a measuring container slidably mounted in said frame, means for raising and lowering and revolving said container through and above the contents of said hopper, a gate hingedly connected to the bottom of said container, means for securing said gate against opening during the first part of the raising operation, means for opening said gate at a predetermined position after the container has been filled, and means for closing said gate during the downward movement of said container.

12. A filling and measuring apparatus comprising a frame, a hopper mounted on said frame, a measuring container slidably mounted in said frame, a conveyor beneath said measuring container adapted to carry receiving containers thereon, means for reciprocally moving said conveyor, and means for raising and lowering said measuring container in said frame, a common means connecting the reciprocal means with the means for raising and lowering said measuring container, means for holding said receiving containers on said conveyor at the end of each advancement thereof, and means for stopping the filling and feeding operation upon the exhausting of the receiving containers on the conveyor.

13. A filling and measuring apparatus comprising a frame, a hopper and a measuring container, one of which elements is slidably mounted with respect to said frame, means for revolving said container within said hopper, and means for dispensing the contents of said measuring container.

14. A filling and measuring apparatus comprising a hopper and a measuring container within said hopper, said hopper and measuring container being relatively reciprocable to bring the top of said measuring container alternately above and below the level of a fluid body within said hopper, means for removing surplus contents from said container while it is above said fluid level, and means for dispensing the contents of said container.

15. A filling and measuring apparatus comprising a hopper and a measuring container within said hopper, said hopper and measuring container being relatively reciprocable to bring the top of said measuring container alternately above and below the level of the fluid body within said hopper, means for removing surplus contents from said container while it is above said fluid level, and means for producing relative revoluble movement between said measuring container and said surplus contents removing means.

EDWARD T. McNANEY.